US011809940B2

(12) United States Patent
Fuerstner

(10) Patent No.: US 11,809,940 B2
(45) Date of Patent: Nov. 7, 2023

(54) ELECTRONIC MARKING

(71) Applicant: RIDDLE & CODE GMBH, Vienna (AT)

(72) Inventor: Thomas Fuerstner, Madliena (MT)

(73) Assignee: RIDDLE & CODE GMBH, Vienna (AT)

(*) Notice: Subject to any disclaimer, the term of this patent is extended or adjusted under 35 U.S.C. 154(b) by 305 days.

(21) Appl. No.: 17/257,272

(22) PCT Filed: Oct. 4, 2019

(86) PCT No.: PCT/AT2019/060327
§ 371 (c)(1),
(2) Date: Dec. 30, 2020

(87) PCT Pub. No.: WO2020/069547
PCT Pub. Date: Apr. 9, 2020

(65) Prior Publication Data
US 2021/0273793 A1    Sep. 2, 2021

(30) Foreign Application Priority Data
Oct. 4, 2018    (WO) ............... PCT/AT2018/060234

(51) Int. Cl.
*H04L 9/40*    (2022.01)
*G06K 19/18*    (2006.01)
(Continued)

(52) U.S. Cl.
CPC ....... *G06K 19/18* (2013.01); *G06K 19/07773* (2013.01); *H04L 9/3247* (2013.01)

(58) Field of Classification Search
CPC ............... H04L 9/0861; H04L 9/3247; G06K 19/07773
See application file for complete search history.

(56) References Cited

U.S. PATENT DOCUMENTS 6,278,864 B1 * 8/2001 Cummins ............... H04B 1/38
                                                    455/260
8,418,917 B1    4/2013 Lewis et al.
(Continued)

FOREIGN PATENT DOCUMENTS

CN    103455831 A    12/2013
CN    104992211 A    10/2015
(Continued)

OTHER PUBLICATIONS

Kommerling, O. et al., "Design Principles for Tamper-Resistant Smartcard Processors," Proceedings of the USENIX Workshop on Smartcard Technology, May 10, 1999, Chicago, Illinois, 13 pages.
(Continued)

*Primary Examiner* — Ghodrat Jamshidi
(74) *Attorney, Agent, or Firm* — McCoy Russell LLP

(57) ABSTRACT

An electronic marking for verifying the authenticity of an object, including an antenna, an analogue transceiver circuit, a microcontroller, and at least one secure cryptoprocessor, in which the antenna is connected to the analogue transceiver circuit; the microcontroller is connected both to the analogue transceiver circuit and the at least one secure cryptoprocessor; the at least one secure cryptoprocessor is designed to securely generate a digital signature; the electronic marking has one or more electrical sensor conductors; the at least one secure cryptoprocessor is connected to at least one of the sensor conductors and designed to determine at least one electrical property of the connected at least one sensor conductor; and the one or more electrical sensor conductor (s) are distinct from the antenna and are positioned to overlap, at least partly, with said antenna.

14 Claims, 4 Drawing Sheets

(51) Int. Cl.
*G06K 19/077* (2006.01)
*H04L 9/32* (2006.01)

(56) References Cited

U.S. PATENT DOCUMENTS

| | | | |
|---|---|---|---|
| 10,650,346 B1* | 5/2020 | Pesavento | G06K 7/10425 |
| 2006/0238302 A1* | 10/2006 | Loving | G06K 7/0008 |
| | | | 340/10.3 |
| 2007/0293209 A1* | 12/2007 | O'Toole | G06K 19/07749 |
| | | | 455/419 |
| 2009/0108063 A1* | 4/2009 | Jain | G06K 7/10237 |
| | | | 235/492 |
| 2013/0278378 A1* | 10/2013 | Hoegerl | G06K 19/07773 |
| | | | 235/492 |
| 2015/0097572 A1* | 4/2015 | Wade | G06K 7/10257 |
| | | | 324/537 |
| 2017/0067961 A1* | 3/2017 | O'Flynn | G01R 31/3004 |
| 2017/0287297 A1* | 10/2017 | Hardie-Bick | G08B 13/246 |
| 2018/0040220 A1 | 2/2018 | Landauer et al. | |
| 2020/0039027 A1* | 2/2020 | Goulet | B24B 49/14 |
| 2021/0112397 A1* | 4/2021 | Viken | H04W 4/80 |

FOREIGN PATENT DOCUMENTS

| | | |
|---|---|---|
| CN | 108596315 A | 9/2018 |
| EP | 3040913 A1 | 7/2016 |
| JP | 2009277085 A | 11/2009 |
| JP | 2012074674 A | 4/2012 |
| KR | 20080091857 A | 10/2008 |
| WO | 2005006247 A1 | 1/2005 |
| WO | 2005106782 A2 | 11/2005 |

OTHER PUBLICATIONS

ISA European Patent Office, International Search Report Issued in Application No. PCT/AT2019/060327, dated Jan. 14, 2020, WIPO, 2 pages.
National Intellectual Property Administration of the People's Republic of China, Office Action and Search Report Issued In Application No. 201980050320.9, dated Jun. 23, 2021, 13 pages. (Submitted with Partial Translation).
Japanese Patent Office, Office Action Issued in Application No. 2021-503138, dated Jun. 29, 2021, 3 pages.
Korean Intellectual Property Office, Office Action Issued in Application No. 10-2021-7006785, dated Nov. 14, 2022, 73 pages. (Submitted with Partial Translation).

* cited by examiner

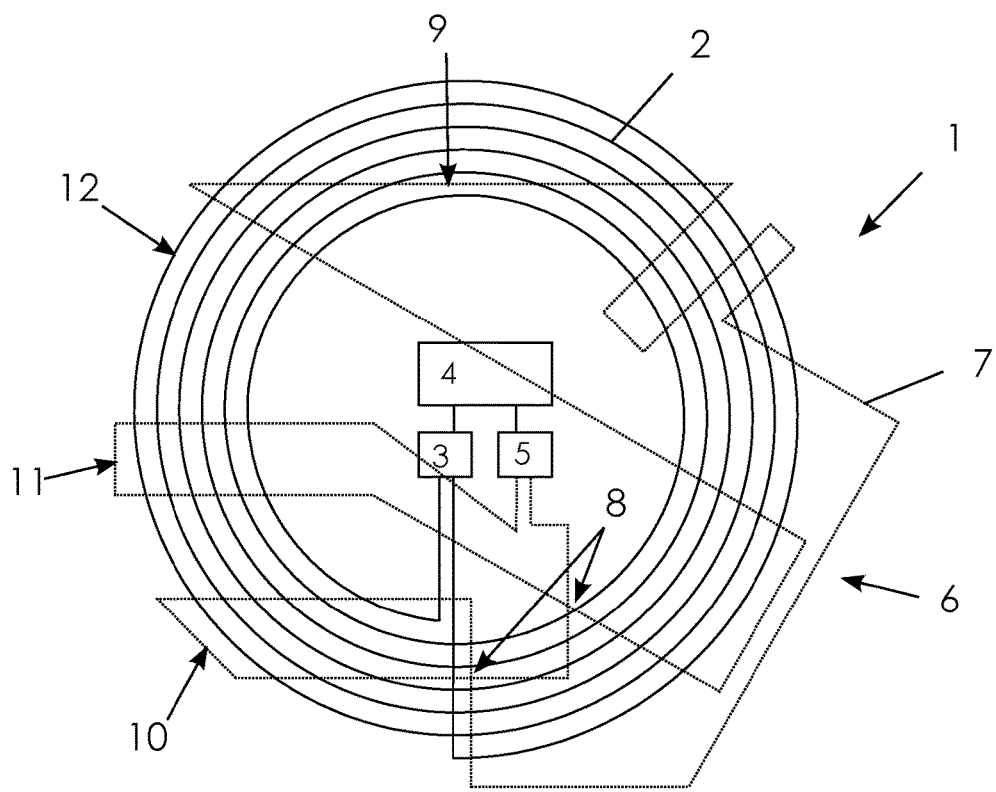
Fig. 1
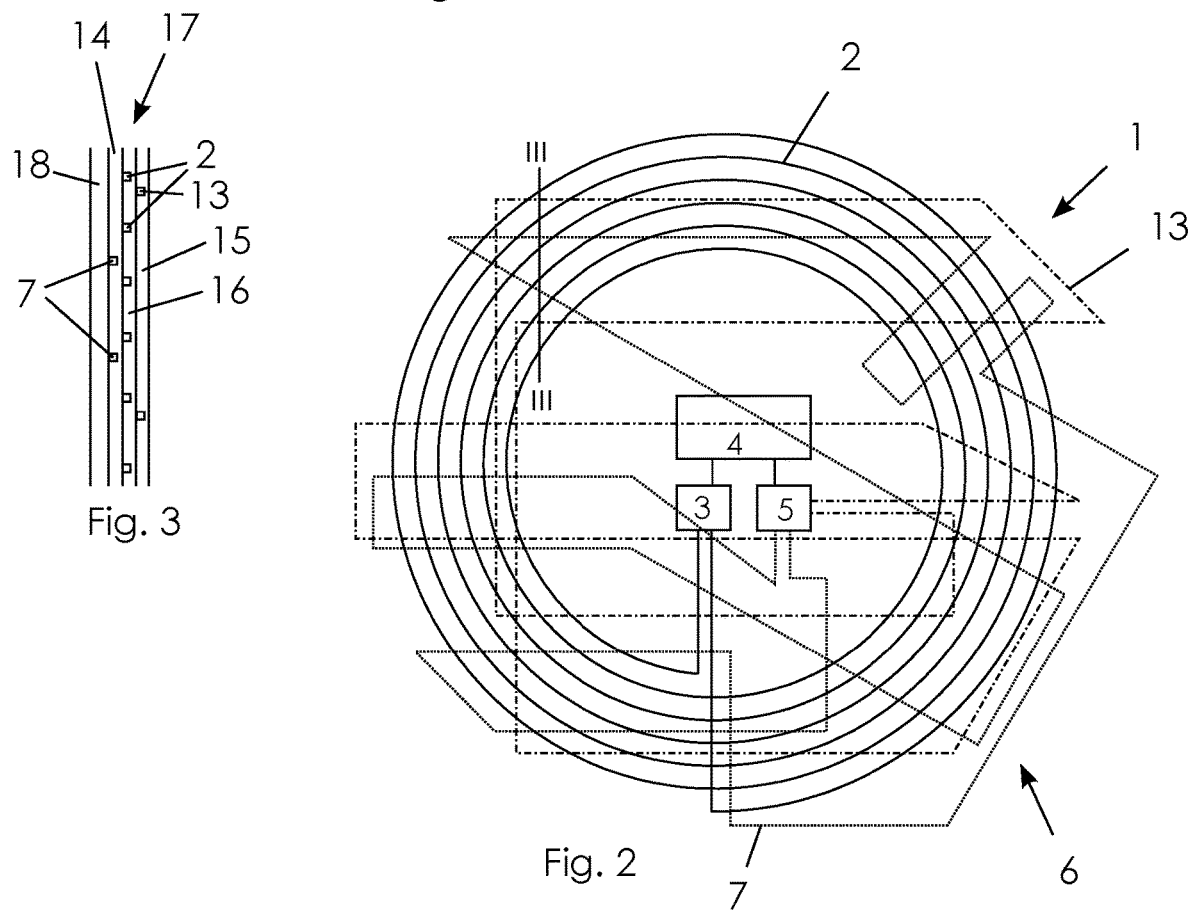
Fig. 3
Fig. 2

ELECTRONIC MARKING

CROSS REFERENCE TO RELATED APPLICATIONS

The present application is a U.S. National Phase of International Application No. PCT/AT2019/060327 entitled "ELECTRONIC MARKING," and filed on Oct. 4, 2019. International Application No. PCT/AT2019/060327 claims priority to International Application No. PCT/AT2018/060234 entitled "ELECTRONIC MARKING," and filed on Oct. 4, 2018. The entire contents of each of the above-listed applications are hereby incorporated by reference for all purposes.

TECHNICAL FIELD

The invention concerns an electronic marking for the verification of the authenticity of an item, comprising: an antenna, an analogue transceiver circuit, a microcontroller, and at least one secure cryptoprocessor, wherein the antenna is connected to the analogue transceiver circuit, wherein the microcontroller is connected to the analogue transceiver circuit and to the at least one secure cryptoprocessor, and wherein the at least one secure cryptoprocessor is configured for securely generating a digital signature. Furthermore, the invention concerns a method for the initialisation, and a method for the validation, of such an electronic marking.

BACKGROUND AND SUMMARY

The antenna can, for example, be a Bluetooth or an RFID antenna. The marking can be applied onto, or integrated into, an object, an item or a product, wherein the authenticity and integrity of the marking confirms the authenticity of the object, item or product, if the same electronic marking cannot be transferred unnoticed to a counterfeit item. The purpose of the present invention is to provide a marking with the greatest possible security. The security of the marking depends on whether the marking can be copied or transferred to another item without damaging its integrity during the transfer.

In order to exclude, for practical purposes, the possibility of copying, the marking includes a secure cryptoprocessor, which is configured for securely generating a digital signature. Such secure cryptoprocessors are of known art. These are essentially specialised integrated digital circuits, which are tamper resistant, meaning that they are protected by physical security measures against any unauthorised access (for reading or writing) from the external environment. Cryptoprocessors are used, for example, in smartcards or hardware security modules in order to prevent a private key that is stored therein from being retrieved. The digital signature that is generated can be transmitted via the microcontroller connected to the cryptoprocessor, and an antenna of the marking connected to the microcontroller, and can thus be verified wirelessly by the receiver. However, the cryptoprocessor cannot prevent it from being separated from a marked item and transferred to another (e.g. counterfeit) item.

Electronic security measures of known art aim to prevent access to a protected object, and to prevent any electronic contact with the protected object. This category includes in particular the security measures of cryptoprocessors. The attacker is interested in maintaining the structural integrity of the protected object because, for example, he would not be able to read the data stored in the cryptoprocessor if he were to destroy the latter.

U.S. Pat. No. 8,418,917 B1 shows examples of such security measures for securing a reader unit for electronic markings. However, the electronic markings described are not themselves protected.

US 2015/097572 A1 shows an electronic security measure to protect a housing. However, it does not disclose a wirelessly readable marking (with an antenna).

Technical details on security measures for electronic circuits can be found, for example, in the publication "Design Principles for Tamper-Resistant Smartcard Processors" by Oliver Kömmerling and Markus G. Kuhn (USENIX Workshop on Smartcard Technology, Chicago, Ill., USA, May 10-11, 1999).

It is an object of the invention to make it difficult to transfer a wirelessly verifiable electronic marking from one marked item, object, or product to another item, object, or product.

In the inventive electronic marking of the type mentioned in the introduction provision is made for the electronic marking to comprise one or more electrical sensor lines (an arrangement of sensor lines is also referred to as a "sensor mesh"), wherein the at least one secure cryptoprocessor is connected to at least one sensor line, and is configured for determining at least one electrical property (a "fingerprint") of the at least one connected sensor line, and wherein the one or more electrical sensor lines is/are distinct from the antenna and is/are arranged at least partly overlapping with the antenna. In this context, an overlapping arrangement means that an essentially flat arrangement of the at least one sensor line is geometrically overlaid (one above or below the other), or overlapped, with at least one line of the antenna, or with a surface enclosed by a line of the antenna.

A possible attack on such a marking is to transfer the marking onto a counterfeit item. Here the attacker is interested in altering the structure of the marking so as to be able to transfer the marking. The invention utilises the fact that the antenna with generic markings must be arranged in a relatively exposed manner and can only be protected by plastic (so as not to obstruct wireless communication). The antenna therefore represents a frequent point of attack in the transfer of such markings because it can be disconnected relatively easily, and the same, or a new identical, antenna can subsequently be reconnected to the transferred circuits. The innovation of the present marking lies in the way in which, in addition to the copy security ensured by the cryptoprocessor, the transferability of the marking is made more difficult. Here the attacker's access to the antenna and the electronic contacts with the antenna are not critical.

The electrical sensor line or lines is/are distributed over the surface of the antenna, or extend over the surface. They are preferably not connected to the antenna. In that the cryptoprocessor determines the property directly, it can be prevented that a measurement is performed on the original and read out, and the microcontroller is then replaced by a simulator. With a direct connection, the measurement cannot be observed without risking the falsification of the measurement result, in which case the cryptoprocessor could be invalidated, for example could be reset.

The protection achieved with the inventive arrangement is particularly effective if the antenna is a coil, in particular a printed coil, wherein the one more electrical sensor lines are at least partly arranged in the coil area of the antenna. An arrangement of the one more electrical sensor lines preferably extends over the whole profile of the coil. In this case it is not possible to open or interrupt the coil unnoticed.

The at least one secure cryptoprocessor is preferably designed to determine at least the resistance, the capacitance or the inductance of the at least one sensor line. A resistance measurement can detect any interruption of one or more sensor lines; a capacitance or inductance measurement can also be sensitive to a change in the geometry of the sensor lines.

It has proved to be particularly beneficial if the electronic marking comprises at least two sensor lines, and the at least one secure cryptoprocessor is configured for determining a coupling between two or more sensor lines. Such couplings depend on many electrical parameters (line length, separation distance, resistance), so that an error-free reconstruction of an arrangement of the sensor lines, once violated, is practically impossible. Alternatively or additionally, the at least one secure cryptoprocessor can also be designed to determine a coupling between one or more sensor lines and the antenna.

In order to avoid a separation of the sensor lines from the rest of the marking, it is advantageous if the electronic marking has at least two sensor lines, and the at least two sensor lines are arranged in at least two sensor layers of the electronic marking. A perfect joining together of once separated sensor layers would require a lot of effort.

If the antenna is arranged in a further antenna layer, distinct from the at least two sensor layers, wherein at least one sensor layer is preferably provided on each side of the antenna layer, the antenna is particularly well protected and cannot be replaced unnoticed, that is to say, without a detectable alteration, as determined by the cryptoprocessor, in the electrical properties of the sensor lines.

According to a preferred form of embodiment, the at least one secure cryptoprocessor is designed to securely generate a digital signature on the basis of a digital key stored in the cryptoprocessor. Alternatively or additionally, the "fingerprint" of the sensor lines can be used as the basis for a unique identification and, for example, a cryptographic seed for a digital key.

In order to render the process of a partial transfer and reconstruction of the electronic marking more difficult, provision can be made for an electronic circuit to be configured for monitoring permanently the one or more electrical sensor lines, and in the event of an interruption of the electrical supply, or in the event of an alteration of the one or plurality of electrical sensor lines, to destroy (e.g. delete) the digital key.

The antenna can preferably be configured for a wireless power supply to the electronic marking (e.g. by inductive coupling), in particular to the microcontroller. In addition, the at least one secure cryptoprocessor can also be supplied with power in the same way, or it can be supplied by way of a separate power supply.

In particular, in the context of permanent monitoring it has proved advantageous for the electronic marking to have a power supply in the form of a printed battery, which is configured for supplying power at least to the at least one secure cryptoprocessor.

For the application of the electronic marking onto the object, item or product that is to be protected, the electronic marking can have an adhesive surface for purposes of affixing the electronic marking onto an object (a valuable item or product) that is to be marked. In particular, the adhesive surface can be arranged on one face of a—preferably flexible—substrate with the antenna and the other components.

The invention furthermore concerns a method for the initialisation of an electronic marking as described above, after the application of the electronic marking onto an object, comprising the following steps: measuring at least one electrical property of the one or more electrical sensor lines (the "sensor mesh"); storing of the measured electrical property in a protected memory of the electronic marking; and deactivating any write access to the protected memory after storage. In this way, a secure and verifiable association between the protected memory and the sensor line(s) is established.

Finally, the invention also concerns a method for the validation of an electronic marking as described above, comprising the following steps: measuring of at least one electrical property of the one or more electrical sensor lines (the "sensor mesh"); loading an electrical property stored in a protected memory; comparing the at least one measured and the at least one loaded electrical property of the one or more electrical sensor lines; and invalidating of the electronic marking if a deviation outside a predetermined tolerance range is detected between the compared electrical properties. Invalidating of the electronic marking may comprise, for example, the destruction (e.g. alteration or deletion) of a digital key stored in the cryptoprocessor.

In this context, it is beneficial if, in the course of the validation, a second digital key of an electronic circuit, for the permanent monitoring of the one or more electrical sensor lines, is validated, wherein the electronic marking is invalidated if the validation of the second digital key fails. If, in the course of the permanent monitoring, the second digital key is destroyed (e.g. deleted or altered), the electronic marking is invalidated as a result.

BRIEF DESCRIPTION OF THE FIGURES

The invention is further explained in what follows on the basis of particularly preferred examples of embodiment, to which, however, it should not be limited, and with reference to the figures. Here in particular:

FIG. 1 shows schematically a first form of embodiment of an electronic marking, with a cryptoprocessor and a sensor line;

FIG. 2 shows schematically a second form of embodiment, similar to the first form of embodiment in FIG. 1, with an additional second sensor line;

FIG. 3 shows schematically a layered structure of the second form of embodiment in FIG. 2 along the cross-section line III-III in FIG. 2, with a substrate, two sensor layers, and between them an antenna layer;

DETAILED DESCRIPTION

Figure 4:
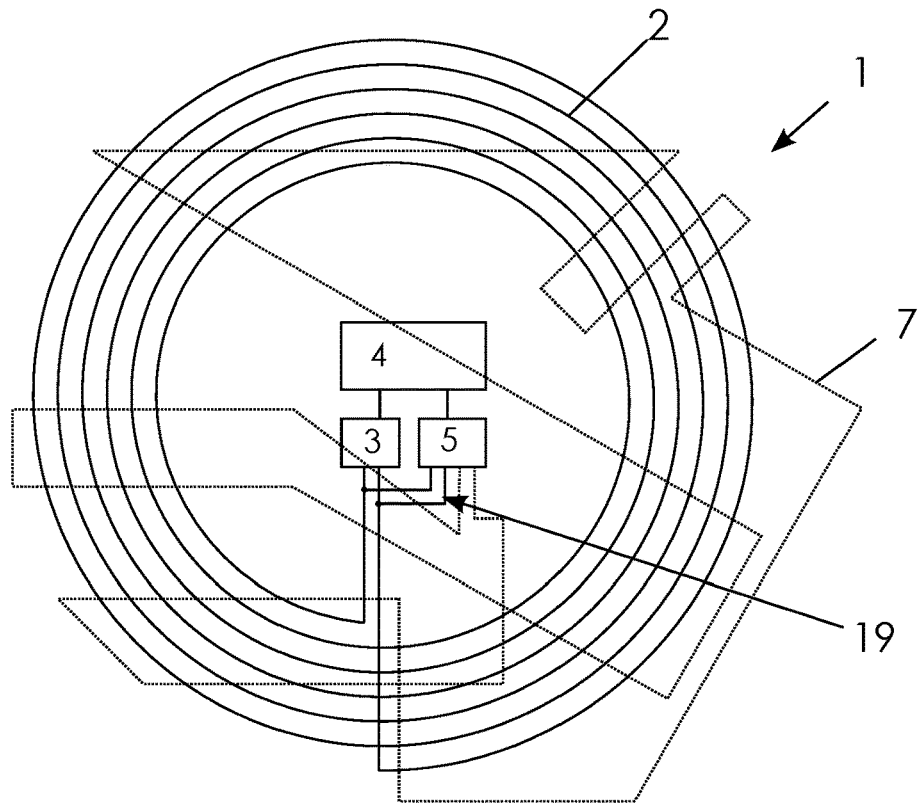
FIG. 4 shows schematically a third form of embodiment, with a cryptoprocessor autonomously supplied with power via the antenna.

FIG. 1 shows a first form of embodiment of an electronic marking 1. The electronic marking 1 has an antenna 2, an analogue transceiver circuit 3, and a microcontroller 4 (in general a digital circuit). These components are of known art from conventional RFID (radio-frequency identification) transponders, and are familiar to the person skilled in the art. The antenna 2 has six windings in the manner of an RFID antenna, which are arranged in the form of a spiral. Needless to say, however, other arrangements of the antenna 2 are also possible, for example essentially triangular, square or rectangular forms. The antenna 2 can, for example, be produced by a printing process. The antenna 2 forms a coil and enables the generation of an alternating voltage in the associated analogue transceiver circuit 3 by the application of an alternating magnetic field and the resulting induction. This alternating voltage can be used to power both the transceiver circuit 3 and also the microcontroller 4, so that their operation does not necessarily depend on an independent energy supply. Such markings are designated as "passive" because they cannot be operated without an energy supply. In contrast to a conventional RFID transponder, the present marking serves not only for the identification, but also for the authentication and proof of the integrity of the marking and—when appropriately attached to a marked object—the authenticity of the marked object.

For this purpose, the electronic marking 1 also has a secure cryptoprocessor 5 and a so-called "sensor mesh" 6. The secure cryptoprocessor 5 is configured for securely generating a digital signature, using a first digital key that is stored securely (i.e. is unreadable) in the latter. In the present first example of embodiment the sensor mesh 6 comprises a first sensor line 7. To distinguish between the different lines the antenna 2 is shown as a continuous line and the first sensor line 7 is shown as a dotted line. The sensor line 7 has a plurality of crossing points 8 along its course. At these crossing points 8 the line sections crossing each other are electrically insulated so that the sensor line 7 is not short-circuited. At the crossing points 8 the sensor line 7 has a plurality of enclosed coil surfaces 9, 10, 11, each with a different direction of rotation. The coil surfaces 9-11 partly overlap with the coil surface 12 of the antenna 2; the sensor mesh 6 (i.e. the one or more electrical sensor lines) is (or are) thus partly arranged in the coil surface 12 of the antenna 2.

The sensor line 7 is connected to the cryptoprocessor 5, and is distinct from the antenna 2, and overlaps both the antenna 2 and the transceiver circuit 3, and also the microcontroller 4. Any separation of the antenna 2 from the circuits 3, 4 would therefore require an interruption of the sensor line 7. The course and/or the length of the sensor line 7 can be determined in a random manner during the production of the marking 1, so that the electrical properties of the sensor mesh 6 (i.e. the one or more electrical sensor lines) are individual for each marking 1. The cryptoprocessor 5 can determine at least one electrical property of the sensor line 7, for example the electrical resistance and/or the inductance. Optionally, the cryptoprocessor 5 can use information about an external magnetic alternating field, which can, for example, be provided by the transceiver circuit 3, and compare it with the time profile of the alternating voltage induced in the sensor line 7. In this way, an induced alternating voltage can be used as an indirect measure for the electrical properties of the sensor mesh 6. The information thus obtained can then be compared with reference values stored by the cryptoprocessor 5, so as to establish the integrity of the sensor mesh 6, if there is a sufficient match, and to transmit a corresponding integrity signal to the microcontroller 4 connected to the cryptoprocessor 5. This integrity signal can be secured with a signature of a private digital key stored in the cryptoprocessor 5, in order to make the authenticity of the integrity information verifiable. The microcontroller 4 can subsequently transmit the signed integrity signal via the transceiver circuit 3 and the antenna 2 to an external receiver (not shown), which is designed for the verification of the electronic marking 1. The integrity signal can optionally contain the determined electrical properties of the sensor mesh 6, and can thus additionally be used for the authentication of the marking 1.

In the same way as the antenna 2, the sensor line 7 can also, for example, be produced by a printing process. Here the sensor line 7 is printed in a specifically provided layer, insulated above the antenna 2, and is then embedded so as to avoid inadvertent damage to the sensor line 7. Here the antenna 2 can be arranged between a mechanically relatively robust substrate, and the layer with the sensor line 7. This ensures that any manipulation of the antenna 2 causes an alteration in the sensor line 7, thus ensuring that the integrity of the marking 1 cannot be violated unnoticed.

The second form of embodiment shown in FIGS. 2 and 3 corresponds to an electronic marking 1 with an increased mechanical sensitivity compared to the first form of embodiment. For the common components described in connection with the first form of embodiment, the same reference symbols are used and reference is made to the above statements to avoid repetition. In addition to these common components, the sensor mesh 6 of the electronic marking 1 in FIG. 2 has a second sensor line 13 (shown schematically as a dot-dashed line). Both sensor lines 7, 13 of the sensor mesh 6 are connected to the cryptoprocessor 5. The above statements concerning the crossing points 8 and the coil surfaces 9-11 of the first sensor line 7 also apply in an analogous manner to the second sensor line 13. In this example, the cryptoprocessor 5 is designed to determine a coupling between the two sensor lines 7, 13. For this purpose it can, for example, apply an alternating voltage to a first sensor line 7, and measure an alternating voltage induced on the second sensor line 13.

To increase the sensitivity to violations of the mechanical integrity of the marking 1, the sensor lines 7, 13 are arranged and embedded in different sensor layers 14, 15. The antenna 2 is provided in another layer, namely in an antenna layer 16 that is distinct from the sensor layers 14, 15. The layered composite 17, composed of the two sensor layers 14, 15 and the antenna layer 16, is arranged on a substrate 18. Here the substrate 18 is selected such that, when the marking 1 is used as intended, a reproducibility of the arrangement of the sensor lines 7, 13 is obtained that is sufficient for the verification of the integrity. On one face of the substrate 18, located opposite to the layered composite 17, an adhesive surface, e.g. in the form of a double-sided adhesive film, can optionally be applied, with which the electronic marking 1 can be affixed onto an object that is to be marked.

The antenna layer 16 is arranged between the two sensor layers 14, 15. By this means, an access to the antenna layer 16 and the antenna 2 arranged therein is only possible after prior mechanical manipulation of at least one of the two sensor layers 14, 15. In any event, if a sensor line 7, 13 is damaged or interrupted in the course of the manipulation, or the geometrical arrangement of one of the two sensor lines 7, 16 is altered, such a manipulation can be detected and signalled by an alteration in the electrical properties of the corresponding sensor lines 7, 13. In addition, depending on the layer material used for the present sensor layer, any manipulation can also be detected, even if there is an alteration in the material composition or the quantity of the layer material, by means of an alteration in an electrical property, for example the inductance or the capacitance.

Generally speaking, in the context of the present disclosure, the electrical properties of inductance and capacitance not only refer to individual measured values, but also to frequency-dependent and/or time-dependent profiles or functions; i.e. which are based on the frequency of an external alternating field and/or on the frequency of an alternating field excited in usage prior to measurement, and which, for example, represent, or in general take into account, the dependence of the respective measured value on the frequency concerned.

The third form of embodiment shown in FIG. 4 differs from the first form of embodiment shown in FIG. 1 in terms of the direct connection 19 of the cryptoprocessor 5 with the antenna 2. Via this direct connection the cryptoprocessor 5 can be supplied with energy from a voltage induced in the antenna 2. In particular, the direct supply of the cryptoprocessor 5 differs from the general supply via the transceiver circuit 3 in the first form of embodiment in that the cryptoprocessor 5 is designed for a lower energy input, as ensues from the different use of the energy thus assimilated: as long as the voltage induced in the antenna 2 is insufficient to supply the full functionality of the marking 1, the cryptoprocessor 5 limits its activity to a monitoring mode of operation (as opposed to an initialisation mode of operation or a validation mode of operation, which are described further below in the context of FIGS. 6 and 7) In this monitoring mode of operation the transceiver circuit 3 and the microcontroller 4 remain inactive. In the monitoring mode of operation, the cryptoprocessor 5 takes a check measurement on the sensor line 7 at time intervals. The time intervals can be selected such that any temporary separation of the antenna 2 and/or the sensor line 7 from the cryptoprocessor 5 would be noticed. If the cryptoprocessor 5 detects such a separation (e.g. due to manipulation), it automatically deletes the digital key required for the generation of an authentic signature from its protected memory, thereby invalidating the marking 1.

Since the energy supply to the cryptoprocessor 5 fails in the event of a separation from the antenna 2, the cryptoprocessor 5 can comprise an autonomously supplied time signal generator, which triggers an invalidation of the marking 1 after a predetermined period of time has elapsed without an external energy supply, which, among other functions, could charge the energy store of the time signal generator. In this context, a second digital key can be stored in the cryptoprocessor 5 for the monitoring mode of operation, which is destroyed if any manipulation is detected in the monitoring mode of operation. In the course of a later validation of the marking 1, the cryptoprocessor 5 can perform a validation of the second digital key, which will naturally fail if the second digital key has been destroyed. This alternative makes it possible to differentiate between the currently detected integrity on the basis of the current electrical properties of the sensor mesh 6 on the one hand, which is confirmed by the detection of the first digital key, and on the other hand the continuous integrity monitored in the monitoring mode of operation, which is confirmed by the detection of the second digital key. Thus, after a longer storage of the marking 1 away from any electromagnetic fields (e.g. in a shielded safe), at least the current integrity of the marking 1 can still be confirmed if the second digital key, but not the first digital key, has indeed been destroyed.

Figure 5:
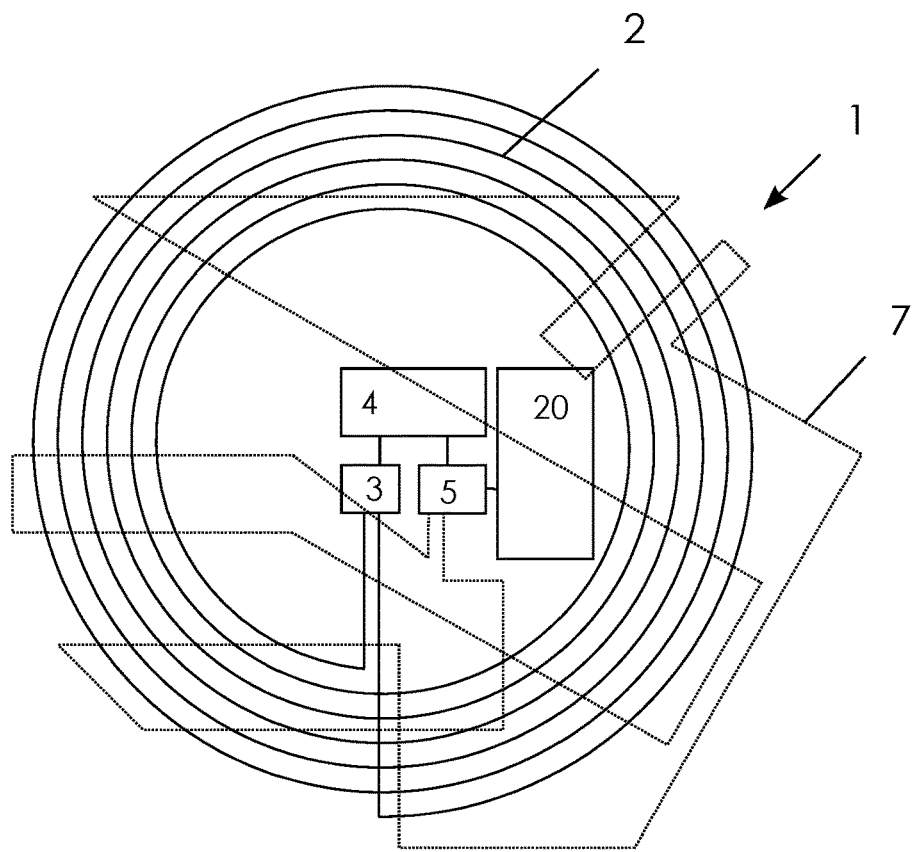
FIG. 5 shows schematically a fourth form of embodiment, with a printed battery to power the cryptoprocessor.

With regard to the monitoring by the cryptoprocessor 5 in the monitoring mode of operation, the fourth form of embodiment shown in FIG. 5 has essentially the same functionality as the third form of embodiment described above. In contrast to the third form of embodiment, however, the energy supply of the cryptoprocessor 5 in the monitoring mode is not provided by drawing energy from an external alternating magnetic field, but from a battery 20, in particular a printed battery. In the absence of an alternating magnetic field necessary for the energy supply and operation of the whole marking 1, only the cryptoprocessor 5 is supplied with sufficient energy for the monitoring mode of operation from the battery 20, to which it is directly connected. With regard to the operation of the cryptoprocessor 5 in the monitoring mode (monitoring mode of operation for short), reference is made, to avoid repetition, to the above statements relating to FIG. 4, which can apply in an analogous manner here. As soon as sufficient energy can be obtained from the antenna 2 for the operation of the whole marking 1, including the transceiver circuit 3 and the microcontroller 4, the battery 20 is recharged.

Figure 6:
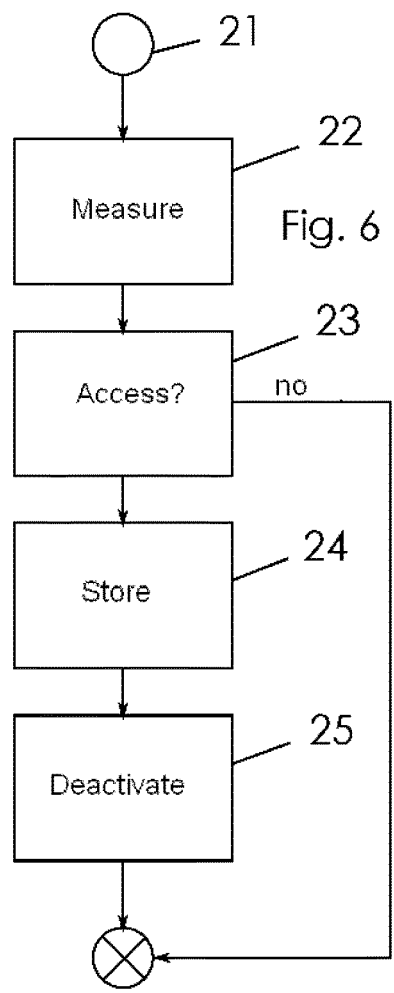
FIG. 6 shows in a simplified manner the essential steps of an initialisation method for an electronic marking.

FIG. 6 illustrates a method for the initialisation of an electronic marking 1 in accordance with the examples of embodiment described here. The application of an alternating magnetic field to the electronic marking 1, and the transmission of an initialisation command to the electronic marking 1, can, for example, serve as the initiator 21 of the method. The microcontroller 4 and/or the cryptoprocessor 5 is/are configured for receiving such an initialisation command. In the course of initialisation, in particular, a protected memory of the cryptoprocessor 5 is initialised. In a first step 22, the cryptoprocessor 5 measures one or more electrical properties of the sensor mesh 6. Which electrical properties come into consideration has already been explained in detail above in the context of the different forms of the sensor mesh 6. In a second step 23, a check is then made as to whether writing into the protected memory of the cryptoprocessor 5 is possible, and thus an access (more precisely: a write access) is possible for the initialisation. If no access is possible, the initialisation is aborted. If access is possible, the results of the measurement or measurements of the electrical properties of the sensor mesh 6, or parameters derived from these results, are stored in the protected memory of the cryptoprocessor 5 as reference value(s) (the third step 24). Then, in the fourth step 25, the write access to the protected memory is deactivated, and the protected memory is thus electronically sealed.

By means of the initialisation method the electronic marking is transformed from an unprotected state, in which the integrity of the electronic marking 1 cannot be verified, and therefore can be neither monitored nor detected, into a protected state, in which the electronic marking is ready for validation. The initialisation method, i.e. the initialisation, can be carried out by the manufacturer of the electronic marking 1 in a protected environment in order to exclude any subsequent manipulation of the sensor mesh 6. Alternatively, the initialisation can also be carried out only after the electronic marking 1 has been applied to an object that is to be protected. This has the advantage that electrical properties can also be used for integrity testing, that they can alter if the electronic marking 1 is deformed, and that the electronic marking 1 can thus protect not only against violations of its own integrity, but also against alterations in its own form, and can monitor and display such alterations. For example, an electronic marking 1 that is bent over an edge can have a different behaviour, and thus different electrical properties with regard to the inductive coupling between the antenna 2 and the sensor mesh 6 (e.g. with the sensor lines 7, 13), than it has in a flat state. In this case an alteration of the bending angle, or an altered position of the bending edge relative to the electronic marking 1 can be detected by the cryptoprocessor 5 and recognised as a manipulation. Furthermore, a sensor line can be embodied in the same way as a strain gauge (with a flexible substrate and a corresponding antenna) and the electronic marking can be elongated by a random extent when applied onto an object, and then initialised. The extent of this elongation can then be measured by the electrical resistance of the sensor conductor, and an unnoticed transfer of the marking would require an exact reproduction of the elongation when it is connected to a counterfeit object, taking into account a possibly different elongation or compression behaviour of the newly marked object compared to the originally marked object. In the context of these security measures, it is generally not necessary to overlap the sensor mesh with the antenna.

Figure 7:
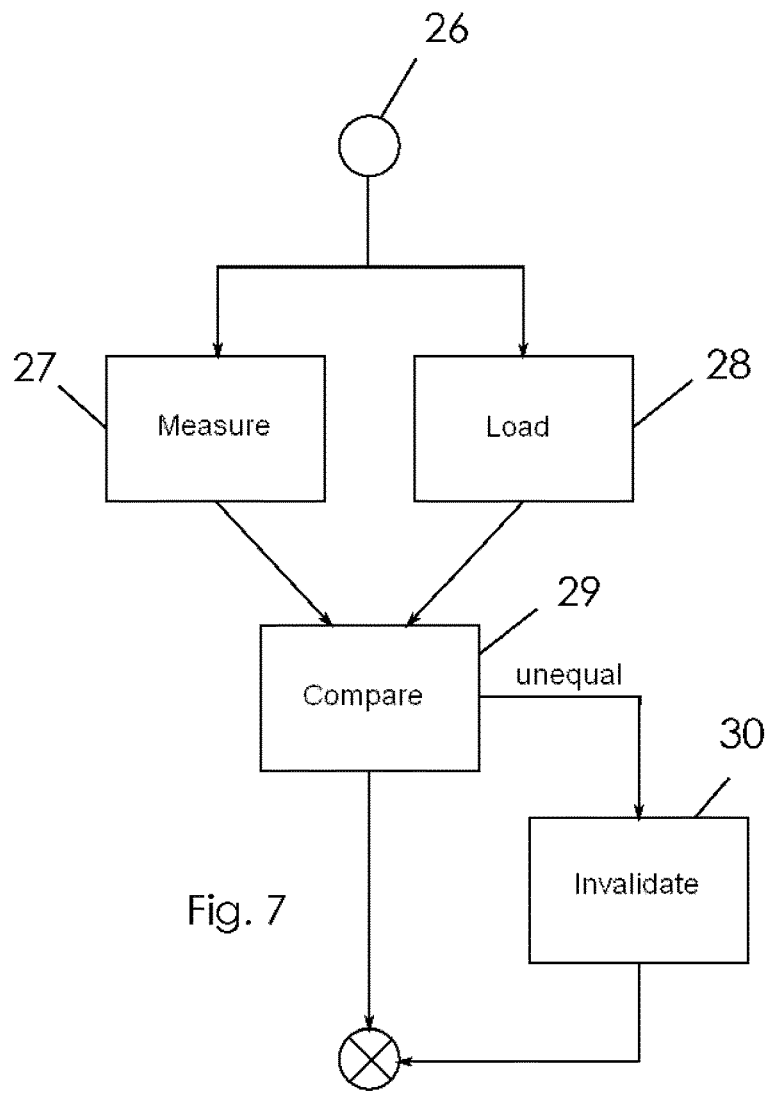
FIG. 7 shows in a simplified manner the essential steps of a validation method for an electronic marking.

FIG. 7 illustrates an example of a method for the verification of the authenticity and integrity (also known briefly as "validation") of an electronic marking 1 in accordance with one of the examples of embodiment shown here. The presence of an alternating magnetic field and the transmission of a validation command can serve as the initiator 26. Consequently, in a first step 27 an electrical property of the sensor mesh 6 that is decisive for the validation is measured, and in parallel in a second step 28 a reference value (e.g. a previously measured electrical property), stored in the protected memory of the cryptoprocessor 5 during initialisation, is loaded. In a comparative step 29, the cryptoprocessor 5 then carries out a comparison of the measured electrical property with the loaded reference value. Alternatively, needless to say, a value derived from the one or more electrical properties can be compared. If a discrepancy between the compared values is detected, which, for example, exceeds a predetermined threshold value, the electronic mark 1 is invalidated in a fourth step 30. At the same time a first digital key stored in the cryptoprocessor 5 is destroyed (altered or deleted) so that the generation in the future of an integrity signal cryptographically signed with this digital key is impossible. If the comparison 29 shows a sufficient match, the cryptoprocessor 5 generates an integrity signal, signs the integrity signal with the first digital key, and passes the signed integrity signal to the microcontroller 4. The microcontroller 4 sends the signed integrity signal via the transceiver circuit 3 to a receiver initiating the validation, e.g. a smart phone. The direct connection of the cryptoprocessor 5 to the sensor mesh 6 prevents the possibility of a valid integrity signal being generated by a manipulation of the measurement of the electrical properties of the sensor mesh 6. Furthermore, provision can be made for the cryptoprocessor 5 to use a plurality of different electrical properties of the sensor mesh 6 for the validation, and to use only a subset of these electrical properties during different runs of the validation method, and to vary randomly the subsets used, and/or to vary randomly the order of measurement of the individual electrical properties. By this means a simulation of certain electrical properties is made difficult, because it is not possible to predict which electrical properties will be measured at what time.

Figure 8:
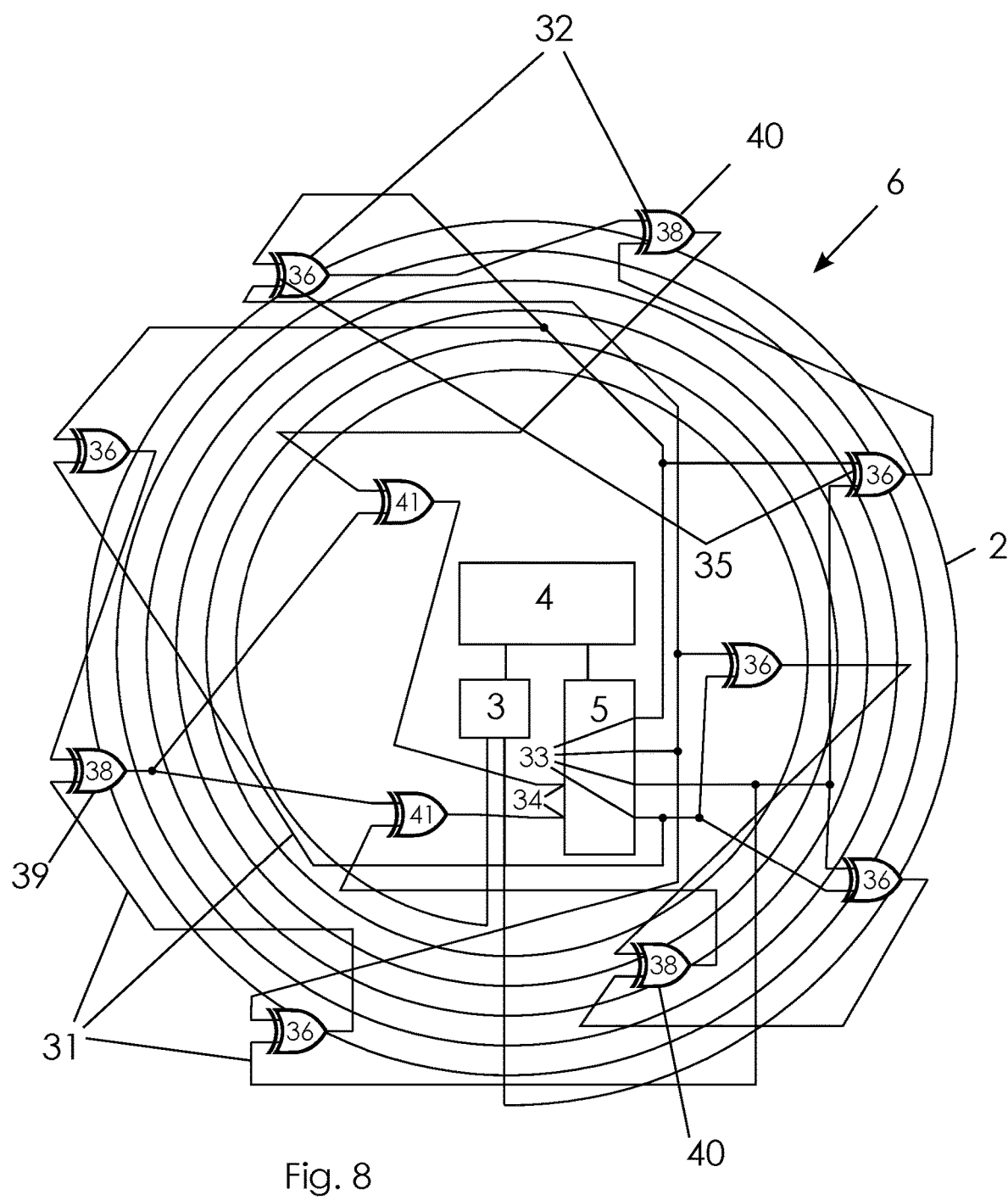
FIG. 8 shows schematically a fifth form of embodiment with a multiplicity of sensor lines connected via logic gates.

The fifth form of embodiment shown in FIG. 8 corresponds to an electronic marking 1, with an extended sensor mesh 6 compared to the first form of embodiment, with a network of a multiplicity of (here: sixteen) sensor lines 31. Here not all sensor lines 31 are directly connected to the cryptoprocessor 5. Instead, the sensor lines 31 are connected to each other via eleven logic gates 32 (here: XOR gates) to form a network or tree. The cryptoprocessor 5 has four signal outputs 33 and two signal inputs 34. Each signal output 33 is connected to inputs 35 of two different logic gates 32 of a total of six logic gates 36 of a first tree level. For their part the outputs 37 of these logic gates 36 are each connected to an input 35 of one of a total of three logic gates 38 of a second tree level. Of these three logic gates 38, the outputs 37 of one logic gate 39 are connected to two inputs 35, and the outputs 37 of the other two logic gates 40 are each connected to one input 35 of a total of three logic gates 41 of a third tree level. The outputs 37 of these two logic gates 41 are each connected to a signal input 34 of the cryptoprocessor 5.

To measure the electrical properties of the sensor mesh 6, the cryptoprocessor 5 can apply different bit combinations to the signal outputs 33. Using the logical signals then propagated through the network and finally applied to the signal inputs 34, the cryptoprocessor 5 can verify the integrity of all sensor lines (i.e. the damage/interruption of just one sensor line can be detected, even if it is not necessarily possible to determine which sensor line 31 has been damaged or interrupted). In another variant, the logic gates 32 can process and pass on not only binary but also quantitative signals, which property enables an even more sensitive integrity check.

The person skilled in the art can combine the five forms of embodiments described above in any combination. For example, two or more networks of sensor lines in accordance with the fifth form of embodiment (FIG. 8) can be provided in different layers of the electronic marking 1 in accordance with the second form of embodiment (FIGS. 2 and 3), and can be connected to the cryptoprocessor 5. Alternatively or additionally, a network of sensor lines in accordance with the fifth form of embodiment (FIG. 8) can be combined with one or more sensor lines 7, 13 in accordance with the first or second form of embodiment (FIGS. 1-3) so as to form a sensor mesh 6. Finally, the variants for autonomous energy supply of the cryptoprocessor 5 described in connection with the third and fourth forms of embodiment (FIGS. 4 and 5) can also be combined with the second and fifth forms of embodiment (FIG. 8).

The invention claimed is:

1. An electronic marking for verification of authenticity of an object, comprising:
    an antenna,
    an analogue transceiver circuit,
    a microcontroller, and
    at least one secure cryptoprocessor,
    wherein the antenna is connected to the analogue transceiver circuit,
    wherein the microcontroller is connected to the analogue transceiver circuit and to the at least one secure cryptoprocessor,
    wherein the at least one secure cryptoprocessor is configured for securely generating a digital signature,
    wherein the electronic marking comprises one or more electrical sensor lines,
    wherein the at least one secure cryptoprocessor is connected to at least one of the one or more electrical sensor lines, and is configured for determining at least one electrical property of the at least one connected sensor line, and
    wherein the one or more electrical sensor lines are distinct from the antenna, and are arranged at least partly overlapping with the antenna,
    wherein the electronic marking comprises an electronic circuit arranged for permanent monitoring of the one or more electrical sensor lines.

2. The electronic marking according to claim 1, wherein the antenna is a coil, wherein the one or more electrical sensor lines are arranged at least partly in an area enclosed by the coil.

3. The electronic marking according to claim 1, wherein the at least one secure cryptoprocessor is configured for determining a resistance, a capacitance, or an inductance of the at least one connected sensor line.

4. The electronic marking according to claim 1, wherein the electronic marking comprises at least two sensor lines, and the at least one secure cryptoprocessor is configured for determining a coupling between the at least two sensor lines.

5. The electronic marking according to claim 1, wherein the electronic marking comprises at least two sensor lines, and the at least two sensor lines are arranged in at least two sensor layers of the electronic marking.

6. The electronic marking according to claim 5, wherein the antenna is arranged in an antenna layer that is distinct from the at least two sensor layers, wherein at least one sensor layer is provided on each of both sides of the antenna layer.

7. The electronic marking according to claim 1, wherein the at least one secure cryptoprocessor is configured for securely generating the digital signature on a basis of a digital key stored in the at least one secure cryptoprocessor.

8. The electronic marking according to claim 7, wherein the electronic circuit is arranged for destruction of the digital key when an interruption of an electrical supply or an alteration in the one or more electrical sensor lines occurs.

9. The electronic marking according to claim 1, wherein the antenna is configured for a wireless power supply of the electronic marking.

10. The electronic marking according to claim 1, further comprising a power supply, wherein the power supply is a printed battery, which is designed to supply power at least to the at least one secure cryptoprocessor.

11. The electronic marking according to claim 1, further comprising an adhesive surface for affixing the electronic marking onto the object to be marked.

12. A method for initializing an electronic marking comprising the following steps:
measuring at least one electrical property of one or more electrical sensor lines of the electronic marking via at least one secure cryptoprocessor configured for securely generating a digital signature, wherein the one or more electrical sensor lines are distinct from and arranged at least partly overlapping an antenna of the electronic marking, wherein the electronic marking comprises an electronic circuit arranged for permanent monitoring of the one or more electrical sensor lines;
storing the at least one measured electrical property in a protected memory of the electronic marking;
and
deactivating a write access to the protected memory after storing.

13. A method for validating an electronic marking comprising the following steps:
measuring at least one electrical property of one or more electrical sensor lines of the electronic marking via at least one secure cryptoprocessor configured for securely generating a digital signature, wherein the one or more electrical sensor lines are distinct from and arranged at least partly overlapping an antenna of the electronic marking, wherein the electronic marking comprises an electronic circuit arranged for permanent monitoring of the one or more electrical sensor lines;
loading at least one stored electrical property, wherein the stored electrical property is stored in a protected memory of the electronic marking;
comparing the at least one measured and the at least one loaded electrical property of the one or more electrical sensor lines; and
invalidating the electronic marking, if a deviation outside a predetermined tolerance range is detected between the at least one stored and at least one loaded electrical properties.

14. The method according to claim 13, wherein during validation, a second digital key of the electronic circuit for permanent monitoring of the one or more electrical sensor lines is validated, wherein the electronic marking is invalidated if the validation of the second digital key fails.

* * * * *